Figure 1:
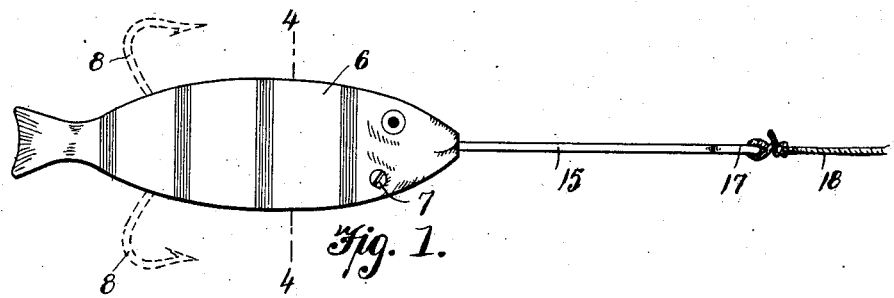

J. NORDLUND.
FISH BAIT.
APPLICATION FILED NOV. 2, 1911.

1,021,699.

Patented Mar. 26, 1912.

Witnesses
Carroll Bailey

Inventor
John Nordlund,
By Victor J. Evans
Attorney

UNITED STATES PATENT OFFICE.

JOHN NORDLUND, OF EUREKA, CALIFORNIA.

FISH-BAIT.

1,021,699.	Specification of Letters Patent.	Patented Mar. 26, 1912.

Application filed November 2, 1911. Serial No. 658,123.

*To all whom it may concern:*

Be it known that I, JOHN NORDLUND, citizen of the United States, residing at Eureka, in the county of Humboldt and State of California, have invented new and useful Improvements in Fish-Baits, of which the following is a specification.

The invention relates to fish hooks and more particularly to the class of trolling baits.

The primary object of the invention is the provision of a bait into which the body thereof simulates a fish, such as a minnow or gold fish, the hooks being projected from the body on a fish attempting to swallow or nibble the bait so as to catch the said fish.

Another object of the invention is the provision of a bait of this character in which the body thereof forms a housing for the hooks which are so arranged therein that under normal conditions the same will be retracted and hidden within the body but on a pull upon the bait the hooks will be projected for the catching of a fish.

A further object of the invention is the provision of a bait of this character which is simple in construction, thoroughly reliable and efficient in operation and inexpensive in manufacture.

In the drawings accompanying and forming a part of this specification is illustrated the preferred form of embodiment of the invention, which to enable those skilled in the art to carry the invention in practice, will be set forth at length in the following description, while the novelty of the invention will be pointed out in the claim succeeding the description.

Figure 2:
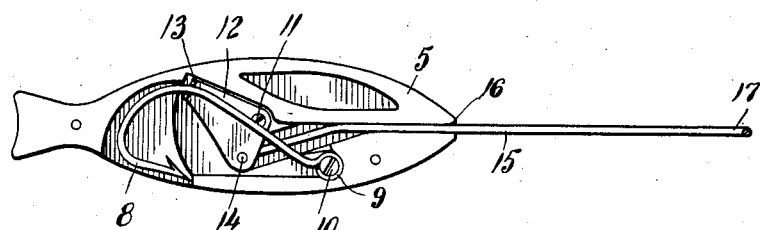
Figure 3:
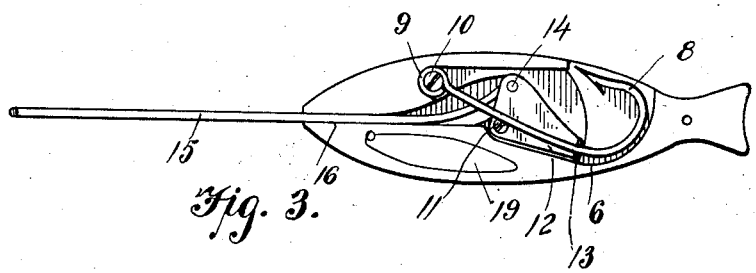
Figure 4:
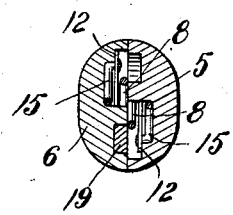

In the drawings:—Figure 1 is a side elevation of a bait constructed in accordance with the invention, the hooks being retracted; Fig. 2 is a side elevation looking toward the inner face of one of the sections of the bait; Fig. 3 is a similar view looking toward the other section; Fig. 4 is a sectional view on the line 4—4 of Fig. 1.

Similar reference characters indicate corresponding parts throughout the several views of the drawings.

Referring to the drawings by numerals the trolling bait comprises a hollow body including complementary shaped sections 5 and 6, the outer surface of which simulate the contour of a small fish such as a minnow or gold fish and is suitably ornamented to give thereto the appearance of said fish although, if desired the body may be formed in any other shape and its sections fastened together by means of ordinary screws 7, the heads of which being flush with the outer surface of the sections forming the body.

Mounted within the body are swinging fish hooks 8, the same being formed with eye extremities 9 loosely engaging pivot screws 10 mounted in the sections 5 and 6 at the inner faces thereof, the hooks being arranged in crossed relation to each other so that upon moving the same they will swing outwardly from the body in opposite directions with respect to each other but normally the said hooks are retracted within the body of the bait.

Swingingly arranged within the body and supported upon pivots 11 mounted in the sections 5 and 6 are plates 12, the same being formed with outturned bifurcated ears 13 in the bifurcations of which are engaged the hooks 8 and loosely connected with these plates 12 are the ends 14 of an actuating bail or rod 15, the same working through a guide passage 16 formed in the sections 5 and 6 respectively, and is bent to provide a loop 17 with which is connected the fishing line 18, it being seen that upon a jerk upon the said line 18 when the hooks 8 are retracted within the body they will become projected exteriorly of said body for the catching of a fish but should the latter swallow or nibble upon the body this will cause a pull upon the same thereby projecting the hooks for the catching of the fish.

Mounted in the section 6 of the body at the inner side thereof is a weight 19 which serves to balance the said body when being pulled through the water or when cast therein so as to prevent the upsetting or turning over of the body or plates on one of its sides.

From the foregoing it is thought that the construction and operation of the invention will be apparent, and therefore, a more extended explanation has been omitted.

What is claimed is:

A bait of the class described comprising a pair of sections connected together, oppositely movable hooks pivotally mounted between the sections and adapted to be normally retracted within the body, swinging plates pivoted between the sections and having outturned bifurcated ears engaging said hooks, and a slidable rod mounted between the sections and engaged with the plates for moving the hooks outwardly on pulling upon the rod.

In testimony whereof I affix my signature in presence of two witnesses.

JOHN NORDLUND.

Witnesses:
H. M. MAUNDER,
A. E. ANDERSON.

Copies of this patent may be obtained for five cents each, by addressing the "Commissioner of Patents, Washington, D. C."